United States Patent
Butinya et al.

(10) Patent No.: US 10,994,552 B2
(45) Date of Patent: May 4, 2021

(54) RECIRCULATION OF A FLUID IN A PRINTER

(71) Applicant: Hewlett-Packard Development Company, L.P., Spring, TX (US)

(72) Inventors: David Butinya, Sant Cugat del Valles (ES); Albert Crespi Serrano, Sant Cugat del Valles (ES); Joan-Albert Miravet Jimenez, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/469,575

(22) PCT Filed: Apr. 21, 2017

(86) PCT No.: PCT/US2017/028781
§ 371 (c)(1),
(2) Date: Jun. 13, 2019

(87) PCT Pub. No.: WO2018/194642
PCT Pub. Date: Oct. 25, 2018

(65) Prior Publication Data
US 2020/0079099 A1    Mar. 12, 2020

(51) Int. Cl.
*B41J 2/175* (2006.01)
*B41J 2/18* (2006.01)
*B29C 64/35* (2017.01)

(52) U.S. Cl.
CPC ........... *B41J 2/17596* (2013.01); *B29C 64/35* (2017.08); *B41J 2/18* (2013.01)

(58) Field of Classification Search
CPC . B41J 2/175; B41J 2/17596; B41J 2/18; B41J 2202/00; B29C 64/35
See application file for complete search history.

(56) References Cited

U.S. PATENT DOCUMENTS 6,428,156 B1 * 8/2002 Waller ...................... B41J 2/175
347/89
7,140,724 B2 * 11/2006 Otis ...................... B41J 2/17596
347/89

(Continued)

FOREIGN PATENT DOCUMENTS

CN    103038064    4/2013
CN    104070825    10/2014

(Continued)

OTHER PUBLICATIONS

Toshiba Tec's new CF3 600 dpi ink-recirculating inkjet printhead, 2016, < http://www.globalprintmonitor.info/index.php/en/news/industry-news/consumables/26675-toshiba-tec-s-new-cf3-600-dpi-ink-recirculating-inkjet-printhead >.

*Primary Examiner* — Anh T Vo
(74) *Attorney, Agent, or Firm* — HP Inc. Patent Department

(57) ABSTRACT

In an example, a printer controller is coupled to a fluid pump, a primer pump, and a pressure sensor of a printer, wherein a flow channel provides a fluid communication between the fluid pump and the printhead for enabling fluid recirculation in the printer. The printer controller: activates the fluid pump; activates the primer pump for a first predefined time interval; and identifies or determines a movement of fluid in the flow channel based on the fluid pressure measured by the pressure sensor.

15 Claims, 2 Drawing Sheets

(56) References Cited

U.S. PATENT DOCUMENTS

| | | | |
|---|---|---|---|
| 7,455,395 B2* | 11/2008 | Wilson | B41J 2/17509 |
| | | | 347/85 |
| 7,871,160 B2 | 1/2011 | Kang et al. | |
| 8,002,395 B2 | 8/2011 | Langford et al. | |
| 8,888,208 B2* | 11/2014 | Cyman, Jr. | B41J 2/175 |
| | | | 347/6 |
| 8,926,077 B2 | 1/2015 | Lacaze et al. | |
| 9,616,673 B2* | 4/2017 | Domae | B41J 2/18 |
| 2005/0057627 A1 | 3/2005 | De Marco et al. | |
| 2006/0132554 A1* | 6/2006 | Ota | B41J 2/17556 |
| | | | 347/85 |
| 2009/0244226 A1 | 10/2009 | Hoshino | |
| 2012/0162331 A1 | 6/2012 | Kataoka et al. | |
| 2013/0169710 A1 | 7/2013 | Keefe et al. | |
| 2015/0375520 A1* | 12/2015 | Arimoto | G01L 27/002 |
| | | | 347/6 |
| 2016/0039216 A1 | 2/2016 | Ribiero et al. | |
| 2016/0288522 A1 | 10/2016 | Pourtier et al. | |
| 2017/0087864 A1 | 3/2017 | Akishiba et al. | |
| 2017/0239956 A1* | 8/2017 | Karita | B41J 2/19 |

FOREIGN PATENT DOCUMENTS

| | | |
|---|---|---|
| CN | 104890369 | 9/2015 |
| CN | 205573341 | 9/2016 |
| CN | 106335278 | 1/2017 |
| JP | 2000236294 | 9/2000 |
| JP | 2003326735 | 11/2003 |
| JP | 2009233972 | 10/2009 |
| JP | 2010076301 | 4/2010 |
| JP | 2013116581 | 6/2013 |
| JP | 2016052720 | 4/2016 |
| JP | 2016083807 | 5/2016 |
| JP | 2017080892 | 5/2017 |
| JP | 2010214691 | 9/2020 |

* cited by examiner

RECIRCULATION OF A FLUID IN A PRINTER

Some printing fluids used in 2D or 3D printers include heavy pigments or heavy particles that can precipitate when the fluid is not moving in the printer. A fluid recirculation system can be used for circulating the fluid in the printer to keep the heavy pigments or heavy particles dispersed in the fluid, for example when the printer is in idle or stand-by mode between printing operations.

BRIEF DESCRIPTION OF DRAWINGS

Certain examples are described in the following detailed description and in reference to the drawings, in which.

DETAILED DESCRIPTION

Figure 1:
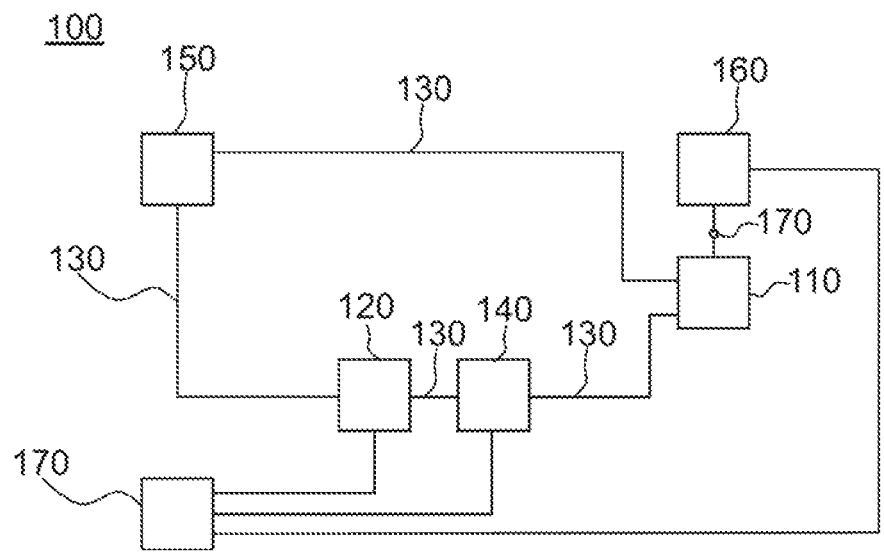
FIG. 1 shows a printer comprising a flow channel for recirculating a fluid, according to an example.

In some 2D and 3D printing apparatuses, a fluid in the printer, for example a fluid used for printing may be circulated in the printer before, during and after printing operations. For example, following a printing operation, the printer may enter a stand-by or idle mode for a certain or undefined time period, and in order to prepare the printer for the next printing operation, printing fluids can be circulated in the stand-by or idle mode to maintain the homogeneity of fluids. For example, printing fluids can comprise special inks, such as white inks or other types of inks containing heavy pigments or heavy particles having a tendency to precipitate in the printer if the printing fluid is not moving. Thus, printing fluid may be circulated in the printer to reduce the possibility of printing fluid precipitation and clogging in the printing apparatus that may influence printer performance. Moreover, printing quality can depend on the homogeneity of printing fluid being disposed on the print target in a 3D printer or on the print media in a 2D printer, where printing fluid recirculation can support the dispersion of particles and pigments in the printing fluid, for example in the ink. In the following description of examples, occasionally, reference is made to ink as one example of a printing fluid, for ease of reference but without limitation to any particular printing fluid being used in a 2D or 3D printing operation.

Ink recirculation can be applied to disperse pigments and particles in ink and other fluids, both in the ink delivery system conveying the ink to a printhead and also in the printhead itself. The ink delivery system can include a flow channel providing a fluid communication between a fluid pump and the printhead. The fluid pump can be used to apply a pressure difference in the flow channel to allow the fluid to recirculate in the printer.

If a fluid recirculation path includes the printhead, the fluid recirculation may be enabled by priming the printhead such as to allow ink to pass through the printhead. For example, a printhead can include a port coupled to an inflatable regulator bag allowing to pressurize the ink inside the printhead, for example to purge air from the printhead via print needles, or to otherwise prime the printhead to open the fluid path and enable ink to flow through the printhead. In an example, the printhead can be moved to a capping station, where a primer pump is coupled to the port of the printhead. The primer pump can be activated to inflate or deflate the regulator bag such as to prime the printhead and enable ink flow. For example, the primer pump can inflate the regulator bag, and a spring member can apply a force to the regulator bag to subsequently press the regulator bag volume back to its previous size.

A short primer pump activation time may be insufficient to prime the printhead and may thus fail to enable the ink recirculation. On the other hand, an excessive primer pump activation time can result in ink leaking from the printhead, for example ink drooling in the capping station.

The primer pump activation time be used to prime the printhead and enable the ink recirculation, with little or no ink leakage effect. Such a selection of primer pump activation time can be challenging, for example because the above discussed regulator bags and spring members can have a large variability in terms of spring force, initial air volume and other properties, influencing the underlying time-constants in an unpredictable manner.

FIG. 1 shows an example of a printer 100 comprising a printhead 110, a fluid pump 120 and a flow channel 130, wherein the flow channel 130 provides a fluid communication between the fluid pump 120 and the printhead 110 for enabling a fluid recirculation in the printer 100. As shown in FIG. 1, the flow channel 130 can be arranged in a ring structure to couple the printhead 110 and fluid pump 120 in a loop, allowing the fluid pump 120 to apply a pressure to the fluid such as to move the fluid in a circle defined by the flow channel 130. In an example, the printer can include a plurality of printheads 110, each coupled to the flow channel 130.

In an example, the fluid conveyed in the flow channel 130 represents ink, for example ink containing heavy pigments or heavy particles, such as white ink including titanium dioxide in its pigments. Ink can tend to precipitate when the ink is not moving and thus can cause the settling of pigments or particles deteriorating the performance of printer components making contact with the ink. The fluid recirculation in the printer 100 can be used to circulate the ink to reduce the possibility of ink precipitation and clogging the printer. Moreover, printing quality can depend on the homogeneity of ink being disposed on the print media, and fluid recirculation can support the dispersion of particles and pigments in the ink.

In an example, the printer 100 can further comprise a pressure sensor 140, wherein the flow channel 130 is arranged in a ring structure that couples the pressure sensor 140 to the printhead 110 and fluid pump 120.

In an example, the pressure sensor 140 can be arranged to measure the fluid pressure in the flow channel 130, for example by having the fluid conveyed by the flow channel 130 pass through a two-port inline pressure sensor 140 included in the fluid path defined by the flow channel 130, or by using a bifurcation to branch off and guide the fluid to a single-port pressure sensor.

In an example, the printer 100 can comprise a fluid reservoir 150, wherein the flow channel 130 is arranged in a ring structure that couples the fluid reservoir 150 to the printhead 110 and fluid pump 120.

In an example, the fluid reservoir 150 can represent a liquid container, for example an ink container coupled into the fluid path using the two-port arrangement connecting to the flow channel as shown in FIG. 1. In an example, the fluid reservoir 150 provides an ink buffer to stabilize or simplify the control of ink pressure in the flow channel 130.

In an example, the printer 100 comprises a primer pump 160 for priming the printhead 110. If the fluid recirculation path includes the printhead 110, the fluid recirculation can, for example, be enabled by priming the printhead 110 to allow the ink to pass through the printhead 110. For example, the printhead 110 can include a port 170 coupled to an inflatable regulator bag allowing the ink to be to pressurized in the printhead 110, for example to purge air from the printhead 110 via needles, or to otherwise prime the printhead 110 for enabling ink to flow through the printhead 110. In an example, the printhead can be moved to a capping station, where a primer pump is coupled to the port 170 of the printhead and activated to inflate or deflate the regulator bag to prime the printhead 110 and to enable the fluid recirculation. For example, the primer pump 160 can inflate the regulator bag, and a spring member can apply a force to the regulator bag to subsequently press the regulator bag volume back to its original size.

In an example, the printer 100 comprises a printer controller 170 coupled to the fluid pump 120, the primer pump 160, and the pressure sensor 140. In an example, the printer controller 170 comprises a processing unit, such as for example a microprocessor or a digital signal processor, coupled to a memory unit, wherein the memory unit includes a program to have the processing unit: operate, determine operating state of, or read measurements from, the fluid pump 120, the primer pump 160, and the pressure sensor 140. In an example, the printer controller 160 activates the fluid pump 120, and while the fluid pump is activated, activates the primer pump 140 for a first predefined time interval. Then, the printer controller 170 identifies or determines a movement of fluid in the flow channel 130 based on the fluid pressure measured by the pressure sensor 150.

When the fluid pump 120 is activated, the fluid pump 120 applies a pressure to the fluid in the flow channel 130 such as to allow fluid recirculation. Further, in order to enable the fluid recirculation, the primer pump 160 is activated in addition to the fluid pump 120 such as to prime the printhead 110 in an attempt to enable the fluid recirculation. As mentioned above, a short primer pump activation time may be insufficient to prime the printhead and may thus fail to enable the fluid recirculation. On the other hand, an excessive primer pump activation time can result in fluid, e.g. ink, leaking from the printhead, for example ink drooling in a capping station.

The primer pump is activated for a first predefined time interval, for example, for a duration of a primer pump activation time that is unlikely to result in fluid, e.g. ink, leaking from the printhead, but may fail to sufficiently prime the printhead to enable the fluid recirculation. In an example, the first predefined time interval can have a time duration in the range of 0.1 sec to 1 sec or 0.1 sec to 0.5 sec.

In an example, after expiry of the first predefined time interval, the primer pump 160 is deactivated, for example to avoid excessive priming that may result in fluid, e.g. ink, leaking from the printhead.

Then, when the primer pump 160 has been deactivated, the printer controller 170 identifies or determines a movement of fluid in the flow channel 130 based on the fluid pressure measured by the pressure sensor 150. In an example, the printer controller 170 identifies or determines a movement of fluid in the flow channel 130 such as to determine if activating the primer pump 160 during the first predefined time interval successfully enabled the fluid recirculation. In an example, the printer controller determines 170 that the fluid recirculation has been enabled if the fluid pressure measured by the pressure sensor 140 in the time interval following the first predefined time interval shows a constant pressure; further discussion on the constant pressure pattern is provided below.

In an example, the printer controller 170 uses the fluid pressure measured by the pressure sensor 120 in a time interval following the first predefined time interval such as to determine if the fluid recirculation has been enabled or not. In an example, the respective time interval following the first predefined time interval can have a time duration in the range of 0.5 sec to 10 sec or 1 sec to 5 sec. For example, the printer controller 170 can monitor the fluid pressure in the fluid conduit 130 in a time interval that follows the expiry of the first predefined time interval, e.g. in a time interval that follows the deactivation of the primer pump 160.

In an example, if the printer controller 170 determines that the fluid recirculation has not been enabled, the printer controller 170 can activate the primer pump 120 for a second predefined time interval. In an example, the second predefined time interval can have a time duration in the range of 0.2 sec to 5 sec or 0.5 sec to 2 sec.

Accordingly, if activating the primer pump 160 during the first predefined time interval was not sufficient to enable the fluid recirculation, a second attempt to enable the fluid recirculation can follow by activating the primer pump 120 for the duration of a second predefined time interval.

In an example, the primer pump 160 is activated during a first predefined time interval, wherein the time duration of the first predefined time interval is predefined, for example such that it is unlikely to result in fluid, e.g. ink, leaking from the printhead 110. Moreover, if it is determined that the first predefined time interval was sufficient to prime the printhead 110 and enable the fluid recirculation, a second primer pump 120 activation can be omitted, because the fluid recirculation has already been activated, and because a second activation of the primer pump 120 could result in fluid, e.g. ink, leaking from the printhead 110.

In an example, if activating the primer pump 160 during the first predefined time interval was not sufficient to enable the fluid recirculation, a second attempt to enable the fluid recirculation is made by activating the primer pump 120 for the duration of a second predefined time interval, wherein the second predefined time interval is longer than the first predefined time interval. For example, selecting a second predefined time interval that has a longer time duration than the first predefined time interval can improve the chances of successfully enabling the fluid recirculation.

In an example, the printer controller 170 determines that the fluid recirculation has been enabled if the fluid pressure measured by the pressure sensor 140 in the time interval following the first predefined time interval shows a constant pressure, or if the fluid pressure measured by the pressure sensor 140 in the time interval following the second predefined time interval shows a constant pressure; see also the below discussion on the constant pressure pattern.

In an example, the printer controller 170 determines an electrical current driving the fluid pump 140 in a time interval following the first predefined time interval, or in a time interval following the second predefined time interval. In this example the fluid pump 140 is an electrical fluid pump 140 driven by an electrical current. Thus, the printer controller 170 can monitor the electrical current used for driving the electrical fluid pump 140 in a time interval that follows the expiry of the first predefined time interval, or that follows the expiry of the second predefined time interval, i.e. in a time interval that follows a deactivation of the primer pump 160. The determined electrical current can then be used as an indicator to identify if the fluid recirculation has been enabled or not; see further discussion on this indicator provided below.

In an example, if the printer controller 170 determines that the fluid recirculation has been enabled, the printer controller 170 deactivates the fluid pump 120 after expiry of a predetermined recirculation time period. Thus, if it has been determined that the fluid recirculation has been enabled, the fluid pump 120 is kept activated during a predefined recirculation time period to perform the fluid recirculation process. The recirculation time may depend on the geometry of the printhead. It may be sufficient to move all the volume of ink that is inside the printhead. That is, after the recirculation there may be fresh ink in the printhead and all the ink renewed. As one example, assuming a flow of 40 cm$^3$/min during 70 seconds will amount to approximately 50 cm$^3$, which may be the volume of ink inside a head according to an example. For example, the predefined recirculation time period can have a time duration in the range of 30 sec to 5 min or 60 sec to 2 min.

In an example, the predetermined recirculation time period runs from the end of the first predefined time interval, if activating the primer pump 160 during the first predefined time interval was sufficient to enable the fluid recirculation. In an example, the predetermined recirculation time period runs from the end of the second predefined time interval, if activating the primer pump 160 during the first predefined time interval failed to enable the fluid recirculation, and activating the primer pump 160 during the second predefined time interval successfully enabled the fluid recirculation.

In an example, the above discussed activation of the primer pump 160 during the second predefined time interval, and the corresponding determination if the activation of the primer pump 160 successfully enabled the fluid recirculation, is repeated until the fluid recirculation has been enabled. Then, the fluid pump 120 is kept activated during a predefined recirculation time period, wherein the predefined recirculation time period runs from the end of the predefined time interval that successfully enabled the fluid recirculation.

In an example, the printer controller 170 uses the fluid pressure measured by the pressure sensor 140 to detect fluid leakage in the printer, for example by monitoring the measured fluid pressure and detecting that the fluid pressure decreases and crosses a pressure value threshold. In an example, upon detecting the fluid leakage in the printer 100, the printer controller 170 can deactivate printer 100 components, such as for example the fluid pump 120, such as to protect the printer 100.

Figure 2:
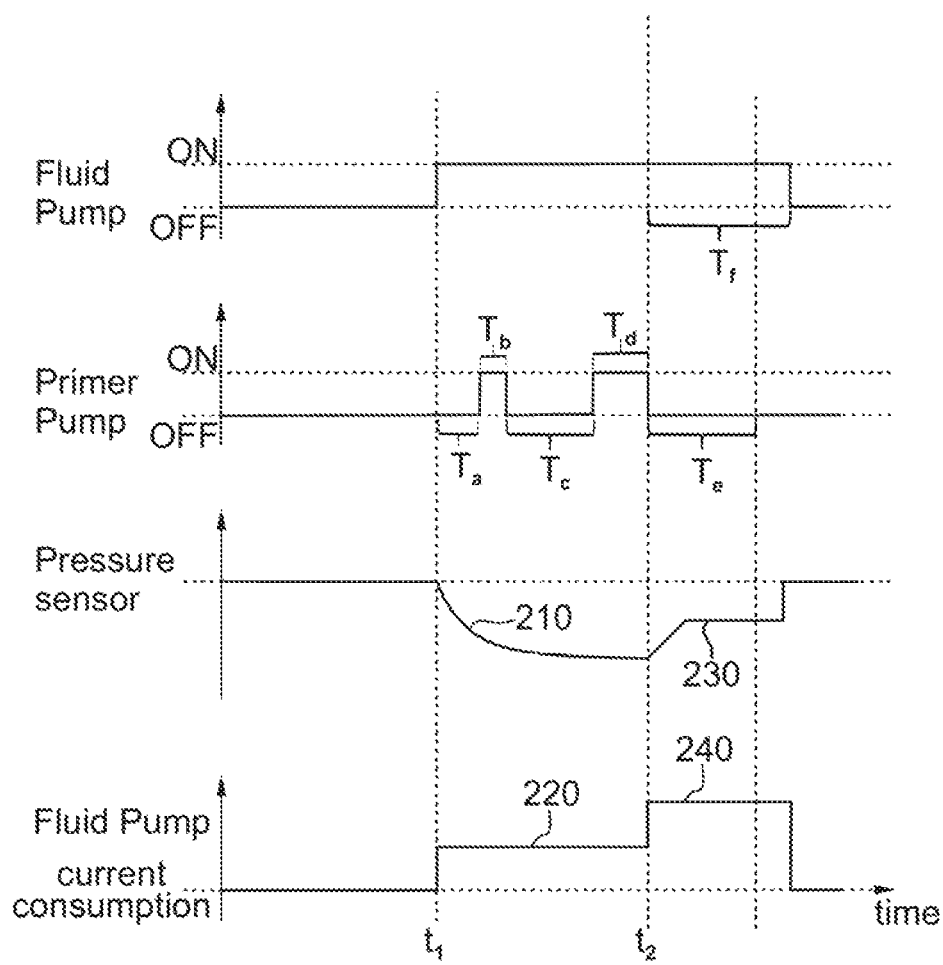
FIG. 2 shows a timing chart of fluid recirculation activation, according to an example.

FIG. 2 shows an example wherein a printer controller is used for enabling fluid recirculation in a printer. FIG. 2 shows how a fluid pump and a primer pump are being activated and deactivated depending on a fluid pressure measured in a flow channel, wherein the flow channel provides a fluid communication between the fluid pump and a printhead for enabling the fluid recirculation.

First, the printer controller activates the fluid pump of the printer, for example at time $t_1$. In an example, while the fluid pump is active, the printer controller can measure the fluid pressure in the flow channel in a time interval $T_a$ to determine if the fluid recirculation has been enabled by activating the fluid pump. The printer controller can determine that the fluid pressure in the flow channel is increasing or decreasing 210, indicating that the fluid is not moving sufficiently in the flow channel to enable the fluid recirculation. Accordingly, the printer controller activates the primer pump to prime the printhead of the printer for a first predefined time interval $T_b$ in an attempt to enable the fluid recirculation.

Then, the printer controller identifies or determines the movement of fluid in a flow channel of the printer based on the fluid pressure in the flow channel measured in a time interval $T_c$ following the first predefined time interval $T_b$ and following the deactivation of the primer pump. In this way, the printer controller identifies or determines the movement of fluid in the flow channel such as to determine if the fluid recirculation has been enabled or not.

FIG. 2 shows that the printer controller activates the primer pump for a second predefined time interval $T_d$, because the fluid pressure measured in the flow channel in the time interval $T_c$, following the first predefined time interval $T_a$, shows an increase or decrease in pressure in the flow channel, indicating that the fluid is not moving sufficiently in the flow channel to enable the fluid recirculation.

In an example, the printer controller can also monitor the electrical current used for driving the electrical fluid pump in the time interval $T_a$, $T_c$ or $T_e$, e.g. in a time interval $T_c$ or $T_e$ that follows a deactivation of the primer pump 160. The determined electrical current can be used as an indicator, for example in addition to the measured fluid pressure, to identify if the fluid recirculation has been enabled or not.

For example, in FIG. 2, the printer controller can determine that the electrical current driving the fluid pump in the time interval $T_c$ 220 following the first predefined time interval $T_b$, has not reached a value corresponding to an enabled fluid recirculation, indicating that the fluid recirculation has not been enabled. This information can be used as a confirmation or replacement of the above discussed identification based on the pressure measurement.

For example, as shown in FIG. 2, the printer controller can determine that the fluid pressure measured in the fluid channel in the time interval $T_c$ following the second predefined time interval $T_d$ shows a constant pressure 230, indicating that the fluid recirculation has been enabled. This is further confirmed by the electrical current driving the fluid pump in the time interval $T_e$ 240, following the first predefined time interval $T_d$, reaching a value corresponding to an enabled fluid recirculation 240.

In the example shown in FIG. 2, upon determining that activating the primer pump during the first predefined time interval $T_b$ failed to enable the fluid recirculation, whereas activating the primer pump during the second predefined time interval $T_d$ successfully enabled the fluid recirculation, the printer controller allows the fluid circulation process to run until the printer controller deactivates the fluid pump after expiry of a predetermined recirculation time period $T_f$.

In the example shown in FIG. 2, predetermined recirculation time period $T_f$ runs from time $t_2$ corresponding to the deactivation of the primer pump at the end of the second predefined time interval $T_d$.

Figure 3:
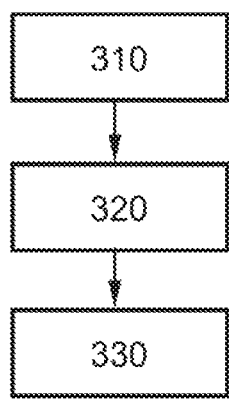
FIG. 3 shows a flow diagram of a method for enabling fluid recirculation in a printer system, according to an example.

FIG. 3 shows an example of a method for enabling fluid recirculation in a printer system. The printer system can include a flow channel providing a fluid communication between a fluid pump and a printhead, and a primer pump for priming the printhead. The method 300 comprises: activating the fluid pump 310; activating the primer pump for a first predefined time interval 320; and measuring the fluid pressure in the flow channel to identify or determine a movement of fluid in the flow channel 330. In an example, the fluid pressure is measured in the flow channel to identify the moving state of the fluid, for example to identify if the fluid is moving, or if the fluid is stationary in the flow channel 330. In an example, the fluid pressure is measured in the flow channel to determine the movement of the fluid, for example to determine the speed or volumetric flow rate of fluid movement in the flow channel 330.

In an example, the fluid pump is activated 310 to apply a pressure to the fluid conveyed in the flow channel such as to allow fluid recirculation. Moreover, in order to enable the fluid recirculation, the primer pump is activated 320 for a first predefined time interval 320, in addition to the fluid pump, such as to prime the printhead in an attempt to enable the fluid recirculation. As mentioned above, a short primer pump activation time may be insufficient to prime the printhead and may thus fail to enable the fluid recirculation. On the other hand, an excessive primer pump activation time can result in fluid, e.g. ink, leaking from the printhead, for example ink drooling in a capping station.

Figure 4:
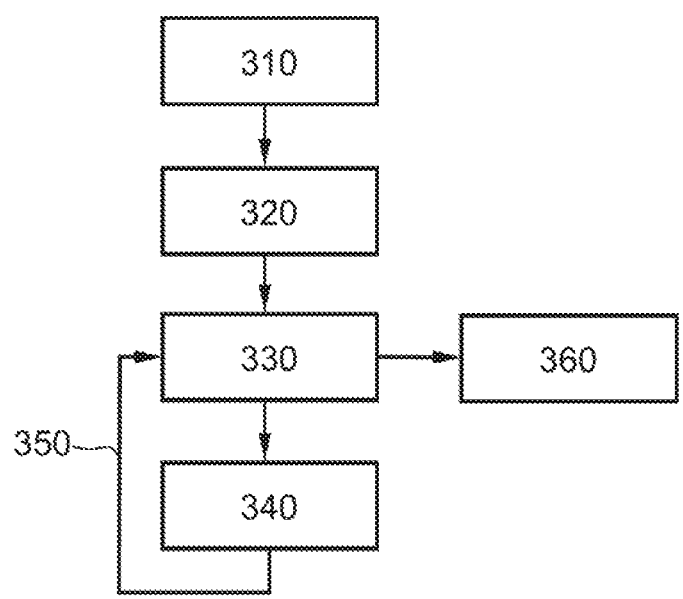
FIG. 4 shows a flow diagram of a method for enabling the fluid recirculation in a printer system, according to an example.

Moreover, in the example shown in FIG. 4, the fluid pressure is measured in a time interval following the first predefined time interval such as to determine if the fluid recirculation has been enabled or not 330. If it is determined that the fluid recirculation has not been enabled, the primer pump is activated for a second predefined time interval 340. Accordingly, if activating the primer pump during the first predefined time interval was not sufficient to enable the fluid recirculation, a second attempt to enable the fluid recirculation can follow by activating the primer pump for the duration of a second predefined time interval.

In an example, it is determined that the fluid recirculation has not been enabled 330 if the fluid pressure measured in the time interval following the first predefined time interval shows an increase or decrease in pressure, indicating that the fluid is not moving sufficiently in the flow channel to enable the fluid recirculation. Accordingly, the printer controller activates the primer pump to prime the printhead of the printer for a second predefined time interval in an attempt to enable the fluid recirculation.

In an example, the second predefined time interval is longer than the first predefined time interval. For example, selecting a second predefined time interval that has a longer time duration than the first predefined time interval can improve the chances of successfully enabling the fluid recirculation.

In an example, the method further comprising measuring the fluid pressure 330 in a time interval following the second predefined time interval 340, 350 such as to determine if the fluid recirculation has been enabled or not. If it is determined that the fluid recirculation has been enabled, deactivating the fluid pump after expiry of a predetermined recirculation time period 360, wherein the predetermined recirculation time period runs from the end of the second predefined time interval. For example, it can be determined that the fluid recirculation has been enabled if the fluid pressure measured in the time interval following the second predefined time interval shows a constant pressure, indicating that the fluid recirculation has been enabled.

In an example, the electrical current driving the fluid pump in the time interval following the first or second predefined time interval can be used as an additional or replacement indicator to determine if the fluid recirculation has been enabled or not. For example, it can be determined that the fluid recirculation has not been enabled if the electrical current driving the fluid pump does not increase in the time interval following the first or second predefined time interval.

The invention claimed is:

1. A printer comprising:
   a printhead;
   a fluid pump;
   a flow channel providing a fluid communication between the fluid pump and the printhead for enabling fluid recirculation in the printer;
   a primer pump for priming the printhead;
   a pressure sensor arranged to measure the fluid pressure in the flow channel; and
   a printer controller coupled to the fluid pump, the primer pump, and the pressure sensor, wherein the printer controller:
   activates the fluid pump;
   activates the primer pump for a first predefined time interval; and
   detects a movement of fluid in the flow channel based on the fluid pressure measured by the pressure sensor.

2. The printer according to claim 1, wherein the printer controller uses the fluid pressure measured by the pressure sensor in a time interval following the first predefined time interval to determine whether the fluid recirculation has been enabled, and activates the primer pump for a second predefined time interval if the fluid recirculation is determined as having not been enabled.

3. The printer according to claim 2, wherein the second predefined time interval is longer than the first predefined time interval.

4. The printer according to claim 2, wherein the printer controller determines that the fluid recirculation has been enabled if the fluid pressure measured by the sensor in a time interval following the first second predefined time interval shows a constant pressure.

5. The printer according to claim 4, wherein if the printer controller determines that the fluid recirculation has been enabled, the printer controller deactivates the fluid pump after expiry of a predetermined recirculation time period, wherein the predetermined recirculation time period runs from the end of the second predefined time interval.

6. The printer according to claim 1, wherein the printer controller determines an electrical current driving the fluid pump in a time interval following the first predefined time interval and uses the determined electrical current to determine whether the fluid recirculation has been enabled.

7. A printer controller for:
   activating a fluid pump of a printer;
   activating a primer pump to prime a printhead of the printer for a first predefined time interval;
   detecting a movement of fluid in a flow channel of the printer based on a fluid pressure in the flow channel measured in a time interval following the first predefined time interval to determine whether a fluid recirculation has been enabled, wherein the flow channel provides a fluid communication between the fluid pump and the printhead for enabling said fluid recirculation;
   activating the primer pump for a second predefined time interval if the fluid pressure measured in the flow channel in the time interval following the first predefined time interval shows an increase in pressure in the flow channel and the electrical current driving the fluid pump has not reached a value corresponding to an enabled fluid recirculation in said time interval following the first predefined time interval.

8. A method for enabling fluid recirculation in a printer system, wherein the printer system includes a flow channel providing a fluid communication between a fluid pump and a printhead, the printer system further including a primer pump for priming the printhead, the method comprising:
   activating the fluid pump;

activating the primer pump for a first predefined time interval; and measuring the fluid pressure in the flow channel to detect a movement of fluid in the flow channel.

9. The method according to claim 8, wherein the fluid pressure is measured in a time interval following the first predefined time interval to determine whether the fluid recirculation has been enabled, and if the fluid recirculation is determined as having not been enabled, the primer pump is activated for a second predefined time interval.

10. The method according to claim 9, wherein the fluid recirculation is determined as having not been enabled if the fluid pressure measured in the time interval following the first predefined time interval shows an increase in pressure.

11. The method according to claim 9, wherein an electrical current driving the fluid pump in the time interval following the first predefined time interval is used to determine whether the fluid recirculation has been enabled.

12. The method according to claim 9, wherein the fluid recirculation is determined as having not been enabled if the electrical current driving the fluid pump does not increase in the time interval following the first predefined time interval.

13. The method according to claim 9, wherein the second predefined time interval is longer than the first predefined time interval.

14. The method according to claim 9, further comprising measuring the fluid pressure in a time interval following the second predefined time interval to determine whether the fluid recirculation has been enabled, and if the fluid recirculation is determined as having been enabled, deactivating the fluid pump after expiration of a predetermined recirculation time period running from the end of the second predefined time interval.

15. The method according to claim 14, wherein the fluid recirculation is determined as having been enabled if the fluid pressure measured in the time interval following the second predefined time interval shows a constant pressure.

* * * * *